United States Patent [19]

Hara et al.

[11] Patent Number: 5,082,915

[45] Date of Patent: Jan. 21, 1992

[54] SOLVENTLESS SILICONE COMPOSITIONS FOR RELEASE PAPER

[75] Inventors: Yasuaki Hara; Masahiko Ogawa, both of Gunma, Japan

[73] Assignee: Shin-Etsu Chemical Company, Ltd., Tokyo, Japan

[21] Appl. No.: 452,445

[22] Filed: Dec. 19, 1989

[30] Foreign Application Priority Data

Dec. 19, 1988 [JP] Japan .................. 63-320198

[51] Int. Cl.$^5$ .................................. C08G 77/06
[52] U.S. Cl. ............................. 528/15; 528/31; 528/32; 525/478
[58] Field of Search ................ 528/15, 31, 32; 525/478

[56] References Cited

U.S. PATENT DOCUMENTS 4,946,878 8/1990 Jensen et al. .................. 528/15

*Primary Examiner*—Melvyn I. Marquis
*Attorney, Agent, or Firm*—Millen, White & Zelano

[57] ABSTRACT

A solventless silicone composition for release paper containing a partially branched organopolysiloxane as a vinyl base polysiloxane to be cured, which may be applied without containing any organic solvents, and which gives a cured film having excellent slip properties and releasability without using any slip-imparting materials.

14 Claims, No Drawings

SOLVENTLESS SILICONE COMPOSITIONS FOR RELEASE PAPER

BACKGROUND OF THE INVENTION

The present invention relates to silicone compositions for release paper which provides excellent releasability and slip properties with substrates, more particularly to a solventless silicone composition for release paper which may be applied without containing organic solvents.

Conventionally, silicone compositions have been used as release agents to prevent the adhesion and fixing between substrates such as paper or plastics and adhesive substances, or to improve the slip between paper and paper, paper and plastics, a plastic film and a plastic film, paper and human fingers, plastics and human fingers, or plastics and metals.

These release agent silicone compositions have been widely used as organic solvent solutions or as aqueous emulsions (see, for example, Japanese Patent Publication Nos. Sho 35-13709, Sho 36-1397, and Sho 46-26798). Since the organic solvent solution-type silicone release agents contain, as a main constituent, gum-like diorganopolysiloxanes of a high molecular weight or of a high polymerization degree, they need large volumes of solvents in their use, and thus inevitably cause air pollution if the solvents are vented into the atmosphere, and they require a substantial cost in the solvent recovery system. In contrast, the aqueous emulsion-type silicone release agents cause no serious air pollution; however, they might cause some environmental pollution from the use of emulsifying agents, and they are required to be heated for a longer time at a high temperature for film formation.

To solve these problems, solventless-type release agent silicone compositions have been proposed which contain virtually no water or organic solvents. Examples of these silicone compositions may be found, for example, in U.S. Pat. Nos. 3,922,443, 4,057,596, and 4,071,644, and Japanese Patent Publication No. Sho. 52-39791. However, the cured film obtained from these compositions has a low polymerization degree, because these compositions use a vinylsiloxane or hydrogensiloxane having a viscosity between 50 and 5,000cSt at 25° C., as a main constituent, and as a result it is inferior in mechanical strength in comparison to that obtained from the conventional organic solvent solution-type silicone compositions stated above. In addition to this disadvantage, it is unsatisfactory in slip properties, and thus the conventional solventless silicone compositions have limited applications.

For example, if the conventional solventless release agent silicone compositions are used for release agents for a kraft tape with a pressure-sensitive adhesive, the application of the kraft tape to corrugated boards is not smoothly done, since the cured film formed on the back side of the kraft tape is poor in slip properties, and the slip between hands and the release surface is not good. Sometimes workers hurt their hands. If this happens, workers cannot apply sufficient force to the kraft tape, and thus the pressure sensitive adhesive does not satisfactorily adhere to the corrugated board, and thus the peeling of the tape from the corrugated board sometimes happens. It has also been pointed out that in case the conventional solventless release agent silicone compositions are applied to paper or a plastic film to make a slip sheet for a cassette tape, a magnetic tape is sometimes damaged, or troubles occur in tape rotation, because the slip between the tape and the slip sheet is not good.

It has further been pointed out that if release paper is manufactured by applying and curing the conventional solventless release agent silicone compositions to paper or a plastic film, the cured silicone film thus obtained contacts a metal or plastic roll before the release paper is wound up. The poor slip properties of the cured film might cause damages to the silicone surface, and this becomes a cause of scattering in release performance of the release paper thus manufactured. The poor slip properties also might make the wind-up of the coated paper or plastic film unsmooth, and thereby cause processing troubles.

To solve these problems in the conventional solventless release agent silicone compositions, various slip-imparting materials, such as dimethylsiloxane oils, polyether modified oils, surfactants, waxes, and metal soaps, have been added. However, satisfactory results have not yet been obtained. Since virtually none of these slip-imparting materials are very compatible with the silicone compositions, the coating fluid thus obtained becomes unstable, and curing often fails to occur. The most serious problem is that almost all of these slip-imparting materials tend to migrate onto the surface of the silicone cured film, and this causes a decrease in the adhesive force between the cured film and the adhesive.

Other methods for improving slip properties have been proposed, as for example, in Japanese Patent Laid-open Publication Nos. Sho. 61-159480 and Sho. 63-101453. However, these methods are still unsatisfactory.

SUMMARY OF THE INVENTION

The object of the invention is to provide a solventless silicone composition for release paper which produces a cured film having excellent slip properties, releasability, and subsequent adhesion. In the present invention, release paper may be composed of any substrate, such as paper, plastic film, or metal foil, and should not be limited to release paper composed of paper.

It has now been found by the inventors that the foregoing object is attained by employing as the vinyl base siloxane to be cured a partially branched one, since a cured film produced from the silicone composition of the invention has a similar level of slip properties to that produced from a conventional solvent-borne release agent silicone composition, and thus it does not require the use of slip imparting materials which tend to migrate onto the surface of a cured film.

The foregoing object, feature and advantages of the invention will be apparent from the following detailed description thereof.

The solventless composition of the invention comprises:

(a) 100 parts by weight of an organopolysiloxane having per molecule at least two silicon-bonded alkenyl radicals, and at least one silicon-bonded radical of the formula:

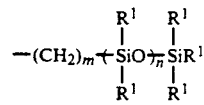

wherein $R^1$ is the same or a different monovalent hydrocarbon radical, n is an integer of 5 to 100, and m is an integer of 2 to 8;

(b) 1 to 100 parts by weight of methylhydrogenpolysiloxane having per molecule at least two silicon-bonded hydrogen atoms; and (c) A catalytically effective amount of a platinum catalyst; and the sum of the number of the alkenyl radicals per molecule in component (a) and that of SiH radical per molecule in component (b) is at least five.

DETAILED DESCRIPTION

Each component of the composition of the invention will be explained in detail.

The organopolysiloxane employed as component (a) in the invention has at least two silicone-bonded alkenyl radicals in a molecule. This organopolysiloxane has a comb-like structure, and is represented by, for example, the following formulae:

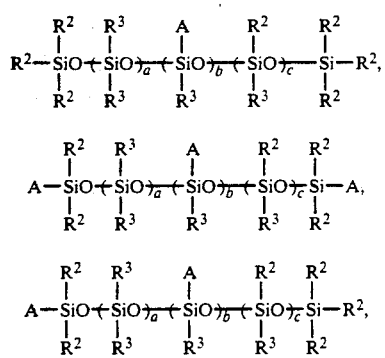

In these formulae, A is a linear polysiloxane radical represented by the formula:

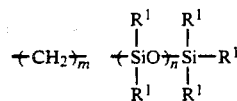

The substituents $R^1$ and $R^3$ are alkyl radicals, e.g., methyl, ethyl, propyl, butyl, etc., aryl radicals, e.g., phenyl, tryl, etc., cycloalkyl radicals, e.g. cyclohexyl, etc., or the same or different, or, substituted or non-substituted monovalent hydrocarbon radicals wherein all or some of the hydrogen atoms bonded to the carbon atoms in the radicals are substituted with halogen atoms, cyano atoms, etc. The most preferable $R^1$ is methyl radical.

The substituent $R^2$ is an alkyl radical, e.g., methyl, ethyl, propyl, butyl, etc., an alkenyl radical, e.g., vinyl, allyl, etc., an aryl radical, e.g., phenyl, tryl, etc., a cyclo alkyl radical, e g., cyclo alkyl, etc., the same or different, or, substituted or non-substituted monovalent hydrocarbon radicals wherein all or some of the hydrogen atoms bonded to the carbon atoms in the radicals are substituted with halogen atoms, cyano radicals, etc.

The most preferable alkenyl radical as $R^2$ is a vinyl radical or allyl radical, and m is an integer of 2 to 8, n is an integer of 5 to 100, a, b, or c is an integer greater than or equal to 1. The most preferable m is 2 or 3.

From the standpoint of practical use, eighty mole percent (80 mole %) of $R^1$, $R^2$, and $R^3$ preferably are methyl groups. By changing the ratio $b/(a+b)$, it is possible to control the level of the slip properties of a cured film produced from the compositions, and the preferable range of this ratio is 0.001 to 0.1.

The organopolysiloxane may be prepared, for example, by reacting an organopolysiloxane represented by, for example, formula [I]:

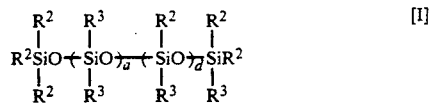

wherein $R^2$, $R^3$, a, b, and c are the same as hereinabove described, and d is b plus c; with an organopolysiloxane having a hydrogen at one end of, for example, formula [II]:

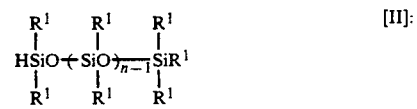

wherein n is an integer of 5 to 100, in a solvent such as toluene, or tetrahydrofuran in the presence of a catalyst for a hydrosilyl reaction such as chloroplatinic acid at 40° to 120° C.

The organopolysiloxane having a hydrogen at one end may be prepared by, for example, the following known method: A trialkylsilanol ($R_3SiOH$) is copolymerized with hexaorganotrisiloxane in an acetonitrile solvent in the presence of a penta-coordinate catalyst such as one represented by formulae [III] and [IV], whereby an organopolysiloxane having a silanol radical represented by formula [V] at one end is produced. The thus-produced organopolysiloxane is reacted with a dialkylchlorosilane in the presence of a hydrochloric acid-uptaking agent (e.g., triethylamine, pyridine, etc.).

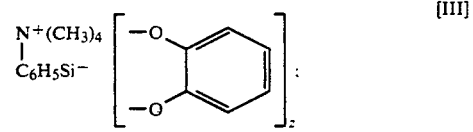

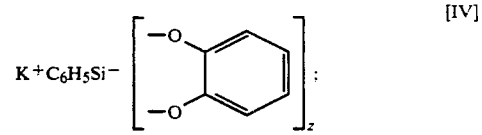

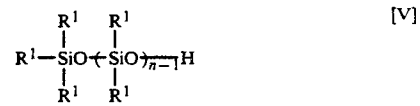

(wherein $R^1$ and n are the same as described in formula [II] above)

An example of the alkenyl group in the organopolysiloxane of component (a) is a vinyl radical, allyl radical, or propenyl radical, and the most preferable alkenyl radical is a vinyl radical. If the amount of the alkenyl radical in the organopolysiloxane is lower than or equal to 0.5 mole %, the silicone compositions do not cure well. If the amount is higher than or equal to 10.0 mole %, the peel resistance of a cured film produced from the silicone compositions becomes too high, and the adhesion of adhesives to the cured film becomes instable from the standpoint of practical use. Thus, the amount of the alkenyl group should be within the range of 0.5 to 10.0 mole %, and preferably of 1.0 to 8.0 mole %.

The organohydrogen polysiloxane which is component (b) of the silicone composition of the invention may be chosen from known organohydrogenpolysiloxanes which contain per molecule at least two, and preferably at least three, hydrogen atoms, which may undergo an addition reaction with an alkenyl radical. At least 90 mole % of the organic radicals other than hydrogen atoms should preferably are methyl groups. Examples of this kind of polysiloxane are homopolymers or copolymers with siloxyl units such as $(CH_3)HSiO$, $HSiO_{1.5}$, $(CH_3)_2SiO$, $CH_3SiO_{1.5}$, $(CH_3)_2,HSiO_{0.5}$, and $(CH_3)_3SiO_{0.5}$. The structure of this polysiloxane may be linear, branched or cyclic, and a polysiloxane having a viscosity of 10 to 500cSt at 25° C. is preferable. The amount of the polysiloxanes may be that in proportion to the amount of the alkenyl radicals contained in component (a), and is generally 1 to 100 parts by weight per 100 parts by weight of the amount of the alkenyl radicals contained in component (a), from the standpoint of the formation of film and peel properties.

The third component (Composition (c)) of the silicone composition of the invention is a catalyst for an addition reaction of components (a) and (b), and may be selected from among such catalysts conventionally used for this kind of reaction as chloroplatinic acid, an alcohol, or an aldehyde solution of chloroplatinic acid, or complexes of chloroplatinic acid and various olefines. Platinum black and various carriers on which platinum is placed may also be used. The catalyst may be present in an amount which is catalytically effective, and the amount should usually be 1 to 1,000 ppm based on component (a), to obtain a good cured film, and from an economic standpoint.

The sum of the number of the alkenyl radicals in component (a) and that of SiH radicals in component (b) should be at least five, to make a crosslinked polymer structure, and to make the thus-copolymerized silicone composition insoluble to solvents.

The silicone composition of the invention may be obtained by blending specific amount of three components (a), (b) and (c). Component (c) is preferably added after obtaining the uniform blend of components (a) and (b). If necessary, reaction retardants such as various organic nitrogen compounds, organic phosphate compounds, acetylene compounds, oxim compounds, and organic chloro compounds, may be added as the fourth component to control the activity of platinum catalysts. The viscosity of the composition of the invention is preferably 50 to 20.000 cSt from the standpoint of the workability in its coating process. The viscosity may be chosen dependent on the amount to be coated, coating methods, or materials of the substrates to be coated. For example, lower or moderate viscosities, of 50 to 3,000 cSt, are used if the amount of coating on substrates is chosen to be in the range of 0.3 to 3.0g/m², in the coating of metal foils or plastics such as polyethylene-laminated papers by means of known coating machines such as roll coaters, gravure coaters, air-knife coaters, curtain-flow coaters, offset-transfer roll coaters, etc. Higher viscosities than those in this range are preferred in the coating of substrates such as glassine papers, kraft papers, and clay-undercoated papers into which release agent compositions are readily absorbed.

Substrates on which the composition of the invention is coated are heated for 5 to 60 seconds at a temperature of 80° to 200° C., or are irradiated for more than 0.2 seconds with a UV radiator of a power of about 80 w/cm, and a cured film is formed on the surface of the substrates. The thus-formed cured film imparts slip properties to the substrate, and coated substrates such as paper, plastic films, and metal foils become useful as release paper. The manual application of an adhesive tape is then smoothly done, because the slip properties of the cured silicone surface is good. In addition, since the cured silicone surface has a light release force and good slip properties, the scope of uses of this release silicone composition may be broadened in comparison with that of the conventional solventless release agent silicone compositions.

As stated above, since the silicone composition of the invention employs a partially branched vinyl-base siloxane as a vinyl-base siloxane to be cured, it may be applied without the use of organic solvents. Thus, it is excellent in the points of energy savings, safety, and environmental pollution. It may also impart a good level of slip properties which has never been attained by the conventional solventless silicone compositions. In addition, the subsequent adhesion is excellent, and the release force is light and constant.

DESCRIPTION OF THE PREFERRED EMBODIMENTS

The release agent silicone composition of the invention is illustrated in more detail by reference to the following examples, wherein the term "parts" means "parts by weight," and the values of viscosity were all measured at 25° C. These examples are illustrative and the claims are not to be construed as limited to them.

EXAMPLE 1

To a solution of 100 g of toluene and 100 g of dimethylpolysiloxane (vinyl value: $7.2 \times 10^{-4}$ mole/g) containing 4.5 mole % of vinyl radicals, having dimethylsilyl radicals at its molecular ends, and of a viscosity of 800 cSt at 25° C., 1 g of a 1% isopropanol solution of chloroplatinic acid was added, and the mixture was heated up to 80° C. To this mixture 160 g of dimethylpolysiloxane (polymerization degree 60) having a SiH radical at one end was dropped, and the reaction was initiated. After the drop of dimethylpolysiloxane, the reaction mixture stood for two hours at 80° to 100° C. Thereafter, 1 g of active carbon was added to this reaction mixture to adsorb the catalyst in the reaction mixture, and the reaction mixture was filtered.

From the thus-obtained filtrate toluene was distilled off, and an oil (oil A) having a vinyl value of $1.4 \times 10^{-4}$ mole/g and a viscosity of 18,000 cSt was obtained.

To 100 g of oil A was added 3 g of methylhydrogenpolysiloxane, both of whose end groups are trimethylsilyl having a viscosity of 20 cSt at 25° C., and 1 g of 3-methyl-1-butyne-3-ol of the formula [V] was further added. This mixture was uniformly mixed and then 2 g of a complex salt of platinum and vinylsiloxane (200ppm in terms of platinum content) was added, and then these components were sufficiently mixed to prepare product 1.

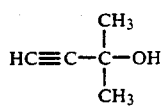

Curability of product 1, peel resistance, slip properties, and the subsequent adhesion of a cured film from product 1 were measured by the methods described below, and the results of these measurements are shown in Table 1.

Measurement of Curability

Product 1 was coated on the surface of polyethylene laminated fine paper in a coated amount of 0.8 g per 1 m$^2$ of the surface area, and the coated paper was then heated for 20 seconds at 120° C. in a hot air circulation-type drying oven. The cured surface was rubbed with a finger and the curability was judged by the dropping-off of the cured composition from the cured surface, and the haze of the cured surface was estimated. The result was very good, and the mark "⊚" in Table 1 means good curability.

Measurement of Peel Resistance

Product 1 was coated on the surface of a polyethylene laminated fine paper in an amount of 0.8 g per 1 m$^2$ of surface area, and heated for 30 seconds at 140° C. in the drying oven, whereby a cured film was formed on the laminated paper. On the surface ORIBAIN BPS-5127 (a product name for an acrylic-type solventborne adhesive manufactured by Toyo Ink Manufacturing Co., Ltd.) or ORIBAIN BPS-2411 (a product name for a rubber-type solventborne adhesive manufactured by the same company) was coated, and heated for 3 minutes at 100° C. Thereafter, a piece of paper having a weight of 40 g per 1 m, was applied to this treated surface, and a pressure of 20 g/cm$^2$ was applied to this paper and kept for a certain time at 25° C. Thereafter, this paper, together with the adhesive, the cured film, and the laminated paper, was cut into strips having a width of 5 cm, to get test pieces. The 180-degree release test was conducted by peeling the applied paper from the test pieces at a rate of 0.3 m/min, 30 m/min, and 60 m/min by using a tensile strength tester, and the peel force(g) required to peel was measured for each test piece.

Measurement of Slip Properties

A cured film of product 1 was formed on the surface of a sheet-like substrate by the same method used in the peel resistance test above. On its surface was placed a piece of urethane rubber or styrene-butadiene rubber. A weight of 200 g was placed on the rubber, and then the rubber was pulled in a direction parallel to the cured silicone surface at a rate of 0.3 m/min, and the kinetic frictional force was obtained by dividing the force(g) required to pull the rubber by 200 g. This procedure employed is similar to that described in ASTM D 1894-63. Slip properties were also evaluated by sliding a finger on a cured film surface, and the results were estimated in terms of the following standards, and the results are shown in Table 1 using the following marks:

⊚: slided very well
○: slided well
x: did not slide
x x: did not slide at all

Measurement of Subsequent Adhesion

A cured film of product 1 was formed on the surface of a sheet-like substrate by the same method as used in the peel strength test given above. On its surface was applied a polyester adhesive tape No. 31B (a product name for a polyester pressure sensitive adhesive tape manufactured by Nitto Denko Corporation), and heated for 20 hours at 70° C. under a pressure of 20 g/cm$^2$, and then the applied polyester tape was peeled. Thereafter, the peeled polyester tape was applied to a stainless-steel sheet, and the 180-degree release test was conducted at a rate of 0.3 m/min, and force 1 required to peel the tape from the stainless-steel surface was measured.

To make a comparison, tape No. 31B was applied to a polytetrafluoroethylene sheet, then heated for 20 hours at 70° C. under a pressure of 20 g/cm$^2$, and then peeled from the sheet. This 180-degree release test was also conducted by applying the peeled tape to a stainless-steel surface, and force 2 required to peel the tape from the stainless-steel surface was measured. The subsequent adhesion was expressed in % by dividing force 1 by force 2.

EXAMPLE 2

Oil B, having a vinyl value of $8.2 \times 10^{-5}$ mole/g, and having a viscosity of 12,000 cSt, was prepared by repeating the same process as that used to prepare oil A in Example 1, but by replacing 160 g of the dimethylpolysiloxane having a SiH radical at one end and having a polymerization degree of 60 used in Example 1 with 120 g of the same dimethylpolysiloxane, but having a polymerization degree of 30. Thereafter, composition was prepared by repeating the same process as that used to obtain composition I in Example 1, but by replacing 100 g of oil A with 100 g of oil B. By using composition II, the same physical properties were measured by using the same methods as those described in Example 1, and the results obtained are also shown in Table 1.

EXAMPLE 3

Oil C, having a vinyl value of $1.29 \times 10^{-4}$ mole/g and having a viscosity of 1,500 cSt, was prepared by repeating the same process as that used to prepare oil A in Example 1 by replacing 160 g of the dimethylpolysiloxane having a SiH radical at one end and having a polymerization degree of 60 as used in Example 1 with 40 g of the same dimethylpolysiloxane but having a polymerization degree of 10. Thereafter, composition III was prepared by repeating the same process as that used to prepare oil A in Example 1, but by replacing 100 g of oil A with 100 g of oil C.

By using composition III, the same physical properties were measured by the same methods as those described in Example 1, and the results obtained are also shown in Table 1.

COMPARATIVE EXAMPLE 1

To 100 g of vinyldimethylpolysiloxane having a vinyl radical only at one end, and having a viscosity of 1,000 cSt at 25° C. which replaces the vinyl radical containing dimethylpolysiloxane used in Example 1, 2 g of the methylhydrogenpolysiloxane, both of whose and groups are trimethylsilyl having a viscosity of 20 cSt at 25° C., and 1 g of 3-methyl-1-butyne-3-ol, were added, and these compounds were uniformly mixed. Thereafter, 2 g of a complex salt of platinum and vinylsiloxane (200 ppm in terms of platinum content) was added, and these components were sufficiently mixed. Composition V was thus prepared.

By using composition the same physical properties were measured by the same methods as those described in Example 1, and the results obtained are also shown in Table 1.

COMPARATIVE EXAMPLE 2

To 100 g of dimethylpolysiloxane containing 4.5 mole % of a vinyl radical, both of whose end radicals are dimethylvinylsilyl groups having a viscosity of 800 cSt at 25° C., 3 g of methylhydrogenpolysiloxane both of whose end radicals are trimethylsilyl having a a viscosity of 20 cSt at 25° C. and 1g of 3-methyl-1-butyne-3-ol, were added, and these components were uniformly mixed. To this mixture 2 g of a complex salt of platinum and vinylsiloxane (200ppm in terms of platinum content ) was added, and these components were sufficiently mixed. Composition V was thus prepared.

By using composition V, the physical properties were measured by the same methods as described in Example 1, and the results are shown in Table 1.

EXAMPLE 4

To composition 1 in Example 1, 4 parts of 4-methoxybenzophenone, a photosensitizer, was added. The thus-prepared composition was coated on polyethylene laminated fine paper in an amount of 0.8 g/m². The coated substrate was irradiated for 3 seconds with a low-pressure mercury vapor lamp of 80 w/cm placed 8 cm from the coated substrate. The curability, peel resistance, slip properties, and residual adhesive rate, were measured. The results are shown in Table 1.

TABLE 1

| | | Slip properties | | | | | Peel Resistance | |
| | | Kinetic Friction Coefficiency | | | | | (g/5 cm) | |
| | Com. | Urethane Rubber | SBR Rubber | Touch | Curability | Subsequent Adhesion (%) | BPS-5127 | BPS-2411 |
|---|---|---|---|---|---|---|---|---|
| Ex. 1 | I | 0.16 | 0.66 | ⊚ | ⊚ | 95 | 41 | 73 |
| Ex. 2 | II | 0.16 | 0.64 | ⊚ | ⊚ | 96 | 35 | 57 |
| Ex. 3 | III | 0.18 | 0.65 | ⊚ | ⊚ | 96 | 32 | 47 |
| C. Ex. 1 | IV | 0.27 | 0.85 | X | ⊚ | 98 | 63 | 135 |
| C. Ex. 2 | V | 0.34 | 0.95 | XX | ⊚ | 98 | 60 | 140 |
| Ex. 4 | VI | 0.16 | 0.64 | ⊚ | ⊚ | 96 | 45 | 70 |

As is apparent from the results in Table 1, the release agent silicone composition of the invention may form a cured film which has good slip properties, a good subsequent adhesion, and a light release force.

From the foregoing description one skilled in the art can easily ascertain the essential characteristics of this invention, and without departing from the spirit and scope thereof, can make various changes and modifications of the invention to adapt it to various uses and conditions.

What is claimed is:

1. A solventless silicone composition for release paper comprising:
    (a) 100 parts by weight of an organopolysiloxane having per molecule at least two silicon-bonded alkenyl radicals, and at least one silicon-bonded radical of the formula:

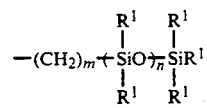

wherein $R^1$ is the same or different monovalent hydrocarbon radical, n is an integer of 5 to 100, and m is an integer of 2 to 8;
    (b) 1 to 100 parts by weight of an organohydrogenpolysiloxane having per molecule at least two silicon-bonded hydrogen atoms; and
    (c) a catalytically effective amount of a platinum catalyst; and the sum of the number of the alkenyl radicals in the organopolysiloxane of component (a) and that of SiH radicals in the methylhydrogenpolysiloxane of component (b), is at least 5.

2. A solventless silicone composition for release paper according to claim 1, wherein the organopolysiloxane of component (a) has a structure of either formula ①, ②, or ③;

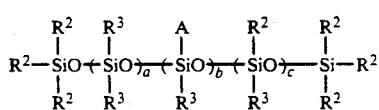 (1)

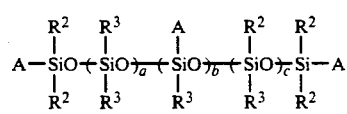 (2)

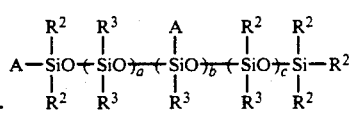 (3)

where A is a silicon-bonded radical of the formula:

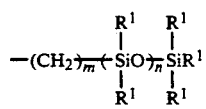

wherein $R^1$ and $R^3$ are alkyls, aryls, cycloalkyls: or the same or different, or substituted or non-substituted monovalent atoms in the radicals are substituted with a halogen atom or a cyano radical; $R^2$ is an alkyl, alkenyl, aryl, cycloalkyl, or the same or different, or substituted or non-substituted monovalent hydrocarbon radical wherein all or some of the hydrogen atoms in the radical are substituted with a halogen atom or a cyano radical; n is an integer of 5 to 100 and m is an integer of 2 to 8; and a, b, c, are positive integers.

3. A solventless silicone composition for release paper according to claim 2, wherein $R^1$ is a methyl group.

4. A solventless silicone composition for release paper according to claim 2, wherein $R^2$ is a vinyl or allyl radical.

5. A solventless silicone composition for release paper according to claim 2, wherein m is 2 or 3.

6. A solventless silicone composition for release paper according to claim 2, wherein the ratio of b to (a+b) is 0.001 to 0.1.

7. A solventless silicone composition for release paper according to claim 1, wherein the alkenyl radical contained in the organopolysiloxane of component (a) is a vinyl radical.

8. A solventless silicone composition for release paper according to claim 1, wherein the content of the alkenyl radical is 0.5 to 10 mole %.

9. A solventless silicone composition for release paper according to claim 1, wherein the organohydrogenpolysiloxane of component (b) has at least three silicon-bonded hydrogen atoms per molecule.

10. A solventless silicone composition for release paper according to claim 1, wherein the organohydrogenpolysiloxane of component (b) is methylhydrogenpolysiloxane.

11. A solventless silicone composition for release paper according to claim 1, wherein at least 90 mole % of the silicon-bonded organic radicals in the organohydrogenpolysiloxane of component (b) are methyl radicals.

12. A solventless silicone composition for release paper according to claim 1, wherein the viscosity of component (b) is 10 to 500 cSt at 25° C.

13. A solventless silicone composition for release paper according to claim 1, wherein the amount of component (c) is 1 to 1,000 ppm in terms of platinum content per 100 parts by weight of component (a).

14. A solventless silicone composition for release paper according to claim 1, wherein the viscosity thereof is 50 to 20,000 cSt at 25° C.

* * * * *